United States Patent
Reme et al.

(10) Patent No.: US 6,922,805 B2
(45) Date of Patent: Jul. 26, 2005

(54) SELECTIVE PACKET RETRANSMISSION WITH TIMING CONTROL AT THE TRANSMITTER END

(75) Inventors: Jean-Marc Reme, Montigny Le Bretonneux (FR); Gilles Delmas, Epinay-Sous-Senart Franc (FR)

(73) Assignee: Koninklijke Phillips Electronics N.V., Eindhoven (NL)

( * ) Notice: Subject to any disclaimer, the term of this patent is extended or adjusted under 35 U.S.C. 154(b) by 429 days.

(21) Appl. No.: 10/161,003

(22) Filed: Jun. 3, 2002

(65) Prior Publication Data

US 2003/0023916 A1 Jan. 30, 2003

(30) Foreign Application Priority Data

Jun. 6, 2001 (FR) .............................. 01 07388

(51) Int. Cl.$^7$ .............................. G08C 25/02
(52) U.S. Cl. ...................... 714/748; 714/776
(58) Field of Search .................. 714/748, 776, 714/55, 746, 749, 18, 20; 375/314; 370/229, 468

(56) References Cited

U.S. PATENT DOCUMENTS

| | | | | |
|---|---|---|---|---|
| 5,570,367 A | * | 10/1996 | Ayanoglu et al. | 370/346 |
| 6,473,399 B1 | * | 10/2002 | Johansson et al. | 370/229 |
| 6,684,354 B2 | * | 1/2004 | Fukushima et al. | 714/718 |
| 6,693,907 B1 | * | 2/2004 | Wesley et al. | 370/390 |
| 6,732,313 B2 | * | 5/2004 | Fukushima et al. | 714/748 |
| 6,757,245 B1 | * | 6/2004 | Kuusinen et al. | 370/230 |
| 2002/0124096 A1 | * | 9/2002 | Loguinov et al. | 709/230 |

OTHER PUBLICATIONS

"RTP Payload Format to Enable Multiple Selective Retransmissions" by Akihiro Miyasaki et al., bearing the reference "draft–ietf–avt–rtp–selret–00.txt" published on Nov. 14, 2000 by IETF.

* cited by examiner

*Primary Examiner*—Phung My Chung
(74) *Attorney, Agent, or Firm*—Gregory L. Thorne

(57) ABSTRACT

The invention proposes a mechanism for retransmitting packets which comprises a step for checking at the transmitter whether the retransmitted packet will be received by the receiver in time to be processed. To this end, the receiver sends in its retransmission request the processing time indication of the packet being processed at the receiver when the request is transmitted. At the transmitter end, this processing time indication is compared with the processing time indication of the packet to be retransmitted so as to authorize or block its retransmission.

13 Claims, 2 Drawing Sheets

SELECTIVE PACKET RETRANSMISSION WITH TIMING CONTROL AT THE TRANSMITTER END

Figure 1:
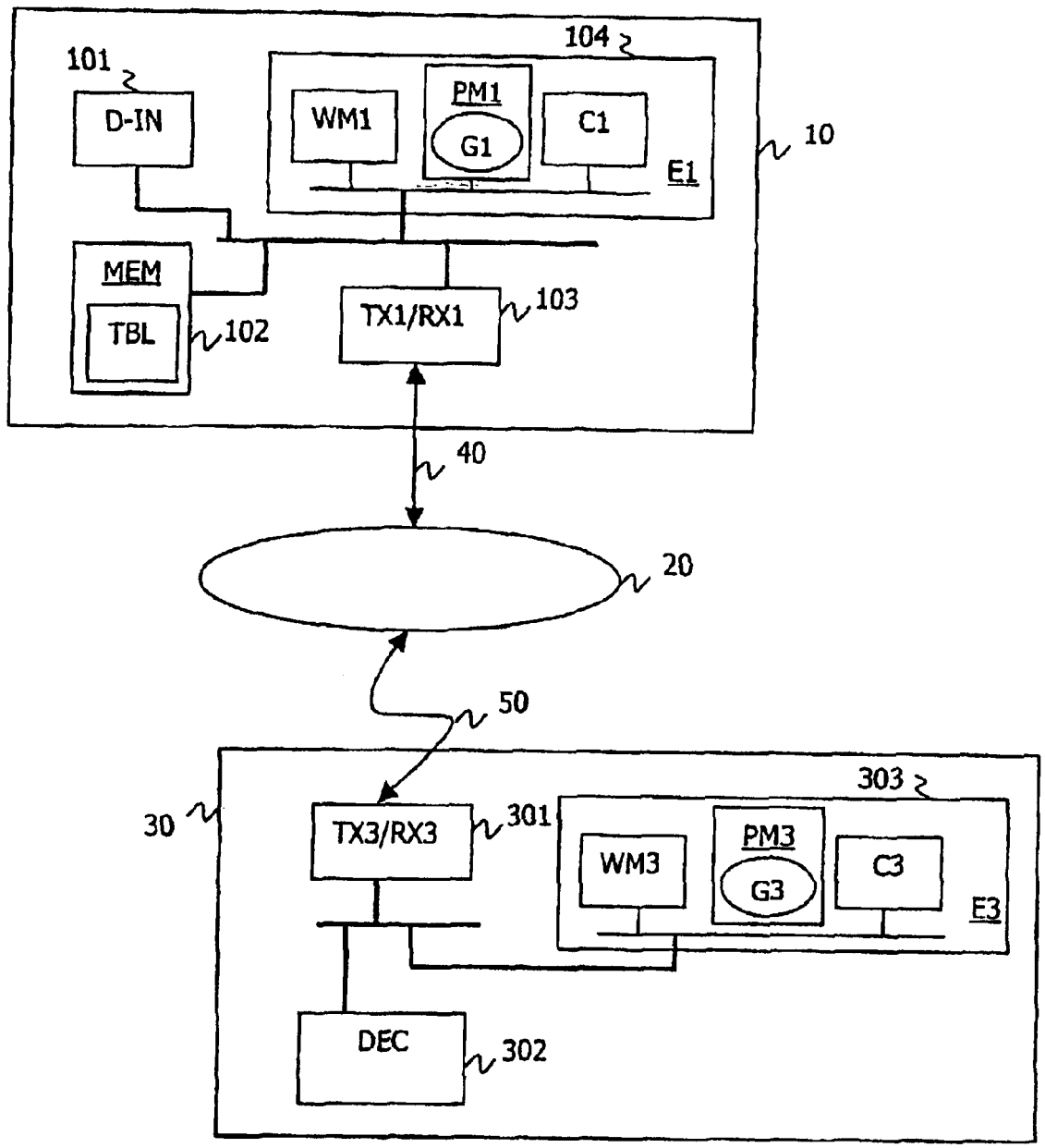

The invention relates to a transmission system comprising at least a transmitter and a receiver, said transmitter comprising means of transmitting packets that contain an indication of packet processing time, and means of receiving retransmission requests relating to a packet to be retransmitted, and said receiver comprising means of receiving packets, means of processing the packets received, and means of transmitting retransmission requests relating to a packet to be retransmitted.

The invention also relates to a terminal comprising means of receiving packets containing an indication of packet processing time, means of processing the packets received, and means of transmitting retransmission requests relating to a packet.

The invention also relates to a server comprising means of transmitting packets containing an indication of packet processing time, and means of receiving a retransmission request relating to a packet to be retransmitted, transmitted by a terminal equipped with means of receiving packets and means of processing the packets received.

The invention also relates to a retransmission method intended to be employed in a transmission system of this kind, and a program comprising program code instructions for implementing a retransmission method of this kind when it is executed by a processor.

The application applies in a general manner to any packet transmission across an unreliable network. It applies in particular to the transmission of video data via the Internet to mobile radio communication terminals.

The document "RTP Payload Format to Enable Multiple Selective Retransmissions" by Akihiro Miyazaki, Hideaki Fukushima, Koichi Hata, Thomas Wiebke, Rolf Hakenberg, Carsten Burmeister, Norihito Takatori and Seiji Okumura, bearing the reference "draft-ietf-avt-rtp-selret-00.txt" and published on Nov. 14, 2000 by the IETF describes a system for transmitting packets between a server and a mobile terminal and presents a mechanism for selective retransmission of packets. This mechanism in particular consists of taking into account at the terminal the transmission delay over the network, to decide to either or not transmit a retransmission request relating to a packet. This mechanism makes it possible to avoid a situation where the mobile terminal transmits a retransmission request when it is apparent that the retransmitted packet cannot be received soon enough to be utilized by the terminal.

This mechanism allows the number of retransmission requests passing over the network to be reduced, and therefore bandwidth to be saved.

One of the object of the invention is to propose a mechanism for selective retransmission that is complementary to that described in that document.

To this end, a transmission system according to the invention and as described in the introductory paragraph is characterized in that at least certain of said retransmission requests contain a recovery data allowing the recovery of the processing time indication of the packet being processed at the moment that the retransmission request is transmitted, and said transmitter comprises means of recovering a processing time indication from a recovery data contained in a received retransmission request, and means of comparing the recovered processing time indication and the processing time indication of the packet to be retransmitted, so as to authorize or block the retransmission of the packet to be retransmitted.

Thus, the invention proposes a control mechanism at the transmitter in order to avoid retransmitting a packet if it is apparent that the retransmitted packet will not be received by the receiver in time to be processed.

A mechanism of this kind usefully complements the mechanism presented in the above-mentioned prior art. In fact, when the prior-art mechanism is utilized, the receiver transmits a retransmission request relating to a packet when it determines, while taking account of the normal transmission delays over the network, that the retransmitted packet can be received in time to be processed. But it may happen that the congestion on the transmission network is such that the retransmission request arrives late at the transmitter. Thanks to the invention, the packet to be retransmitted is not retransmitted by the transmitter when the retransmission request arrives so late that it is no longer possible for the retransmitted packet to be received in time by the receiver.

In a first embodiment of the invention, said recovery data is the indication of the processing time of the packet being processed at the moment that the retransmission request is transmitted. This embodiment is advantageously utilized when the processing time indication contained in a packet is specific to that packet, that is to say, when two different packets cannot contain the same processing time indication.

In a second embodiment of the invention, said packets contain a sequence number, and said recovery data is the sequence number of the packet being processed at the moment that the retransmission request is transmitted, and said transmitter comprises means of comparing the sequence number contained in a retransmission request with the sequence number of the packet to be retransmitted when the recovered processing time indication and the processing time indication of the packet to be retransmitted are identical, so as to authorize or block the retransmission of the packet to be retransmitted.

This embodiment is advantageously utilized when several packets can contain the same processing time indication. If the packet that was being processed at the moment that the retransmission request was transmitted and the packet to be retransmitted have the same processing time indication, the comparison of their sequence numbers makes it possible to determine whether or not it is useful to retransmit the packet to be retransmitted.

Another object of the invention is to limit the number of data that have to be stored at the transmitter to allow possible retransmission of packets.

To this end, in an advantageous embodiment of the invention, the packets contain a sequence number, said transmitter comprises a memory for storing data relating to at least certain packets, particularly the sequence numbers of said packets, and means of erasing from said memory the data relating to at least certain of the packets which have a sequence number less than or equal to that of a packet to be retransmitted, when the retransmission of said packet to be retransmitted is blocked.

These and other aspects of the invention are apparent from and will be elucidated, by way of non-limiting example, with reference to the embodiment(s) described hereinafter.

Figure 2:
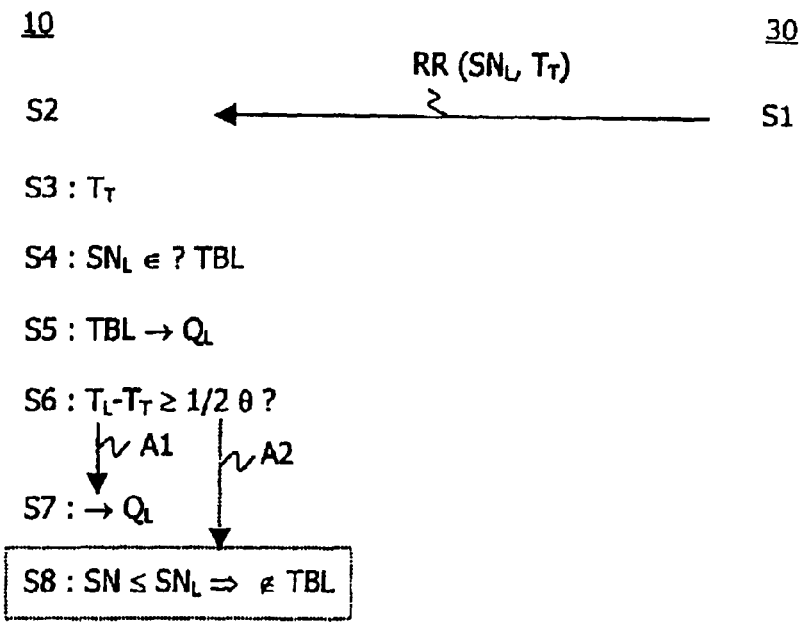
Figure 3:
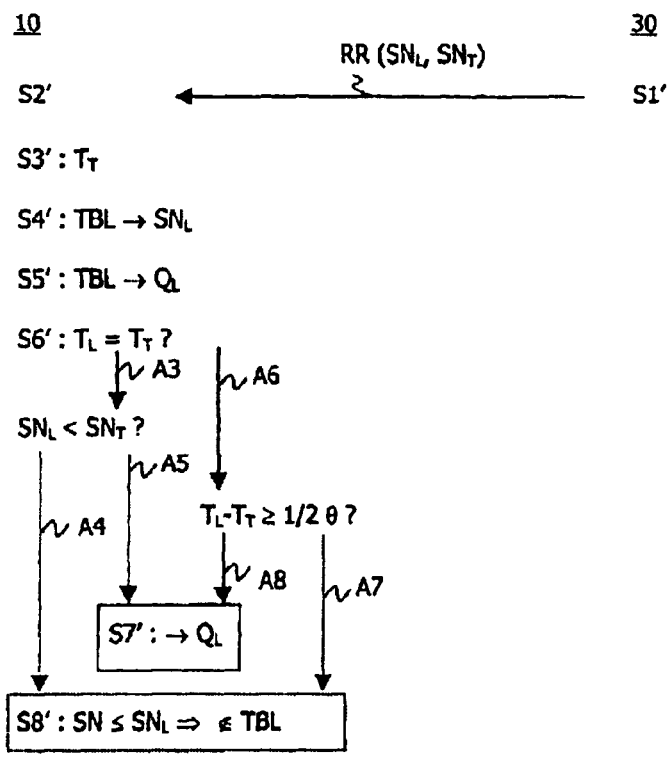

In the drawings:

FIG. 1 is a functional diagram of an example of a transmission system according to the invention, FIG. 2 is a diagram describing the steps in a first embodiment of a retransmission method according to the invention, and FIG. 3 is a diagram describing the steps in a second embodiment of a retransmission method according to the invention.

FIG. 1 shows an example of a transmission system according to the invention comprising a server 10 which performs the function of a transmitter according to the invention, a transmission network 20, and a terminal 30 which performs the function of a receiver according to the invention.

The transmission network 20 is, for example, a cellular network such as a GPRS network or a UMTS network. The server 10 is connected to the transmission network 20 by a link 40, such as a link accessing a packet-type network like the Internet. The terminal 30 is connected to the cellular network by a radio link 50.

The server 10 comprises a data source D-IN represented by a block 101, a memory for storing data MEM represented by a block 102, a transceiver device TX1/RX1 represented by a block 103, and a microprocessor assembly E1 represented by a block 104 and comprising a dynamic memory WM1, a program memory PM1 and a processor C1. The terminal 30 comprises a transceiver device TX3/RX3 represented by a block 301, a processing device DEC represented by a block 302, a microprocessor assembly E3 represented by a block 303 and comprising a dynamic memory WM3, a program memory PM3 and a processor C3. The program memories PM1 and PM3 contain a program or group of programs G1 and G3 respectively, containing program code instructions for implementing a retransmission method according to the invention such as will be described with regard to FIGS. 2 and 3.

In a general manner, the invention applies when the packets transmitted by the server contain a processing time indication which is intended to be used by the terminal for processing the packets received. A processing time indication is an indication from which the time when the packet must be processed by the receiver can be recovered. When the transmitter and the receiver do not have a common time reference, the processing time indication transmitted in the packet is advantageously a duration. And the receiver recovers the processing time from this duration and from a time reference of its own.

By way of example, the data supplied by the data source D-IN are data coded in the MPEG-4 format. In this case, the processing device DEC is a decoder of the MPEG-4 type. And the processing time indication is the indication of decoding time DTS which is defined in paragraph 7.3.4 of the standard MPEG-4 standard (document ISO/IEC 14496-1).

The transmission between the server 10 and the terminal 30 is advantageously effected by using a transport protocol of the RTP type. The RTP transport protocol is described in the document RFC1889 published by the IETF. In particular:

RTP-type packets contain a field entitled "Timestamp". This "Timestamp" field is advantageously used to transmit the processing time indication of the packet.

RTP packets also contain a field entitled "Sequence Number" which will be referred to in the remainder of this description. The sequence number SN contained in this field is incremented by unity each time an RTP packet is transmitted. It is intended to be used by the receiver in order to detect the loss of one or more packets in a packet sequence.

RTP packets also contain a "Payload" field which contains the useful data, such as the data coded in the MPEG-4 format.

As is emphasized in the above-mentioned prior art, the transmitted packets do not necessarily all have the same importance for the receiver. In order to avoid overloading the network, it is advantageous to limit the possibility of retransmission to the most important packets. In the following of the description, these packets are referred to as retransmittable packets. In order to allow the retransmission of packets, certain data relating to the retransmittable packets must be stored at the server 10. These data are stored, for example, in a table TBL which is recorded in the data memory MEM.

FIG. 2 shows a diagram describing the steps in a first embodiment of a retransmission method according to the invention. This embodiment is advantageously used when the processing time indication contained in a packet belongs to that packet, that is to say, when two different packets cannot contain the same processing time indication. When the data transmitted are data coded in the MPEG-4 format, this condition is satisfied if the images are small enough to be transmitted in a single RTP packet.

In this first embodiment, the server stores for each retransmittable packet in the table TBL the sequence number SN, the processing time indication T, and the useful data contained in the "Payload" field.

The retransmission method shown in FIG. 2 comprises:

A step S1 for transmission by the terminal 30 of a retransmission request RR relating to a packet $Q_L$ which has been lost. This request RR contains the processing time indication $T_T$ of the packet $Q_T$ which is being processed at the terminal 30 when the terminal 30 transmits the retransmission request RR. The request also contains the sequence number $SN_L$ of the packet $Q_L$ to be retransmitted. A request of this kind is transmitted, for example, in an RTCP packet as described in paragraph 6 of RFC1889. In this case, the processing time indication $T_T$ and the sequence number $SN_L$ of the packet $Q_L$ to be retransmitted are transmitted in the "profile-specific extensions" field of the RTCP packet.

A step S2 for reception of the retransmission request RR by the server 10.

A step S3 for recovery of the processing time indication $T_T$ contained in the received retransmission request.

A step S4 for retrieval from the table TBL of the sequence number $SN_L$ of the packet $Q_L$ to be retransmitted. If the sequence number $SN_L$ does not appear in the table TBL, this means that the packet to be retransmitted is not retransmittable.

A step S5 for recovery from the table TBL of the processing time indication $T_L$ of the packet $Q_L$ to be retransmitted.

A step S6 for comparison of the processing time indications $T_T$ and $T_L$, the result of said comparison being used for authorizing or blocking the retransmission of the packet $Q_L$ to be retransmitted. By way of example, this step S6 comprises checking whether the difference $\delta$ between the processing time indications $T_T$ and $T_L$ is greater than half of an estimate $\theta$ of the round-trip transmission time on the transmission network. If $T_L - T_T \geq \frac{1}{2}\theta$, (arrow A1), retransmission takes place in step S7. If $T_L - T_T < \frac{1}{2}\theta$ (arrow A2), retransmission is blocked.

FIG. 3 shows a diagram describing the steps of a second embodiment of a retransmission method according to the invention. This embodiment is advantageously used when several packets can contain the same processing time indication. In this case, it is possible for the packet to be retransmitted and the packet being processed when the retransmission request is transmitted to contain the same processing time indication. The sequence numbers of the two packets are then advantageously compared to determine whether the receiver still needs the packet to be retransmitted. In this second embodiment, the server 10 must store in the table TBL the sequence number SN, the processing time indication T and the useful data contained in the "Payload" field for all the transmitted packets.

The retransmission method shown in FIG. 3 comprises:

A step S1' for transmission by the terminal 30 of a retransmission request RR relating to a packet $Q_L$ which has been lost. This request RR contains the sequence number $SN_T$ of the packet $Q_T$ which is being processed at the terminal 30 when the terminal 30 transmits the retransmission request RR. This sequence number $SN_T$ is in the form of recovery data of the processing time indication $T_T$ of said packet. The retransmission request RR also contains the sequence number $SN_L$ of the packet to be retransmitted. If the retransmission request RR is transmitted in an RTCP packet, the sequence numbers $SN_T$ and $SN_L$ respectively, are transmitted in the "profile-specific extensions" field of the RTCP packet.

A step S2' for reception of the retransmission request RR by the server 10.

A step S3' for recovery from the table TBL of the processing time indication $T_T$ of the packet $Q_T$ being processed at the moment that the retransmission request RR was transmitted, from the recovery data $SN_T$ contained in the received retransmission request.

A step S4' for retrieval from the table TBL of the sequence number $SN_L$ of the packet to be retransmitted.

A step S5' for recovery from the table TBL of the processing time indication $T_L$ of the packet $Q_L$ to be retransmitted.

A step S6' for comparison of the processing time indications $T_T$ and $T_L$. This step comprises:

checking whether $T_L = T_T$ if $T_L = T_T$ (arrow A3), the sequence numbers $SN_L$ and $SN_T$ are compared.

if $SN_L < SN_T$ (arrow A4), retransmission is blocked.

if $SN_L > SN_T$ (arrow A5), transmission takes place in step S7'.

if $T_L \neq T_T$ (arrow A6), check whether $T_L - T_T \geq \frac{1}{2}\theta$ if $T_L - T_T < \frac{1}{2}\theta$, (arrow A7), retransmission is blocked.

if $T_L - T_T \geq \frac{1}{2}\theta$ (arrow A8), retransmission takes place in step S7'.

By way of advantage, the method according to the invention includes an additional step shown in dotted lines in FIGS. 2 and 3, and bearing the references S8 and S8', respectively. This additional step comprises erasing from the table TBL the data that are no longer useful. As shown in FIGS. 2 and 3, when the retransmission of a packet $Q_L$ to be retransmitted is blocked (arrows A2, A4 and A7), the data relating to the packets which have a sequence number SN less than or equal to the sequence number $SN_L$ of the packet $Q_L$ to be retransmitted are erased from the table TBL. This embodiment makes it possible to avoid a situation where the table TBL expands excessively.

Decision thresholds other than those described above can be utilized. In step S6', for example, a minimum difference between the sequence numbers $SN_L$ and $SN_T$ can be imposed in order to authorize retransmission of the packet $Q_L$.

The invention is not limited to the transmission of data coded in the MPEG-4 format, nor to the use of the protocol RTP. The invention applies in a general manner to any transmission of data in which real-time and sequencing problems arise, from the moment that a processing time indication for the data has been transmitted with the data.

What is claimed is:

1. A transmission system comprising:
   at least one transmitter (10);
   at least one receiver (30);
   said transmitter including:
   means of transmitting packets (TX1) that contain an indication of packet processing time ($T_T$, $T_L$), where $T_T$ is the processing time of a packet $Q_T$ being processed at the moment that a retransmission request (RR) is transmitted, and $T_L$ is the processing time of a packet $Q_L$ to be retransmitted, and
   means of receiving (RX1) retransmission requests (RR) relating to a packet to be retransmitted ($Q_L$);
   said receiver including:
   means of for receiving (RX3) packets,
   means of processing the packets received (DEC), and
   means of transmitting (TX3) retransmission requests relating to a packet to be retransmitted;
   wherein at least certain of said retransmission requests contain a recovery data ($SN_T$; $T_T$) allowing the recovery of the processing time indication ($T_T$), where $SN_T$ is a sequence number for a packet $Q_T$; and
   said transmitter further including:
   means (E1) of recovering a processing time indication ($T_T$) from a recovery data ($SN_T$, $T_T$) contained in a received retransmission request, and
   means (E1) of comparing the recovered processing time indication and the processing time indication of the packet to be retransmitted, so as to authorize or block the retransmission of the packet to be retransmitted, whereby retransmission is permitted if $T_L - T_T \geq \frac{1}{2}\theta$ ($\theta$ being an estimate of the round-trip transmission time on an associated transmission network), and if $T_L - T_T < \frac{1}{2}\theta$, retransmission is blocked.

2. A transmission system as claimed in claim 1, characterized in that said packets contain a sequence number (SN), said transmitter comprises a memory (TBL) for storing data relating to at least certain packets, in particular the sequence numbers of said packets, and means of erasing from said memory the data relating to at least some of the packets that have a sequence number less than or equal to that of a packet to be retransmitted, when the retransmission of said packet to be retransmitted is blocked.

3. A transmission system as claimed in claim 1, characterized in that said recovery data is the processing time indication of the packet being processed at the moment that the retransmission request is transmitted.

4. A transmission system as claimed in claim 1, characterized in that said packets contain a sequence number, said recovery data is the sequence number of the packet being processed at the moment that the retransmission request is transmitted, and said transmitter further includes means of comparing the sequence number contained in a retransmission request and the sequence number of the packet to be retransmitted when the recovered processing time indication ($T_T$) and the processing time indication ($T_L$) of the packet to be retransmitted are identical, so as to authorize or block the retransmission of the packet to be retransmitted.

5. A terminal (30) comprising:
   means of receiving (RX3) packets containing a predetermined indication of packet processing time (T);
   means (DEC) of processing the packets received;
   means (TX3) of transmitting retransmission requests relating to a packet; and
   means for including in at least some of said retransmission requests predetermined recovery data ($T_T$; $SN_T$) allowing the recovery of a processing time indication ($T_T$) of the packet being processed at the moment that the retransmission request is transmitted, for permitting determination of whether a racket can be transmitted in time to be processed by said processing means.

6. A terminal as claimed in claim 5, characterized in that said recovery data is the processing time indication of the packet being processed at the moment that the retransmission request is transmitted.

7. A terminal as claimed in claim 5, characterized in that said packets contain a sequence number, and said recovery data is the sequence number of the packet being processed when the retransmission request is transmitted.

8. A terminal as claimed in claim 5, wherein said at least one transmitter and at least one receiver are each radio communication devices.

9. A server (10) comprising:
- means (TX1) for transmitting packets containing an indication of packet processing time (T) to a remote transceiver;
- means (RX1) for receiving from said transceiver a retransmission request (RR) relating to a packet to be retransmitted ($Q_L$), wherein at least certain of said retransmission requests contain a recovery data ($SN_T$; $T_T$) allowing the recovery of the processing time indication of the packet being processed at the moment that the packet retransmission request is transmitted ($T_T$);

said server further including:
- means (E1) of recovering a processing time indication from a recovery data contained in a received retransmission request; and
- means (E1) of comparing the recovered processing time ($T_T$) indication and the processing time ($T_L$) indication of the packet to be retransmitted, so as to authorize or block the retransmission of the packet to be retransmitted.

10. A server as claimed in claim 9, wherein said means for transmitting packets includes:
- a memory (TBL) for storing data relating to at least certain packets, in particular sequence numbers of said packets, and
- means for erasing from said memory the data relating to at least some of the packets which have a sequence number less than or equal to that of a packet to be retransmitted, when the retransmission of said packet to be retransmitted is blocked.

11. A method of retransmitting a packet intended to be implemented in a transmission system including a first transceiver (10) for transmitting packets containing an indication of packet processing time ($T_L$), and a second transceiver (30) for receiving packets and processing the packets received, said method comprising the steps of:
- transmitting via said second transceiver a retransmission request (RR) relating to said packet;
- receiving said retransmission request at said first transceiver, wherein said retransmission request contains data ($SN_T$; $T_T$) for recovering the processing time indication ($T_T$) of the packet being processed at the moment that the packet retransmission request is transmitted;
- recovering at said first transceiver the processing time indication ($T_T$) from the recovery data contained in the received retransmission request;
- comparing at said first transceiver the recovered processing time indication ($T_T$) and the processing time indication ($T_L$) of the packet to be retransmitted, so as to authorize (A1; A5; A8) or block (A2; A4; A7) the retransmission of the packet to be retransmitted by said first transceiver.

12. A program comprising instructions for implementing a packet retransmission method as claimed in claim 11 when it is executed by a processor.

13. The method of claim 11, wherein in said comparing step retransmission is permitted if $T_L - T_T \geq \frac{1}{2}\theta$ ($\theta$ being an estimate of the round-trip transmission time on an associated transmission network), and if $T_L - T_T < \frac{1}{2}\theta$, retransmission is blocked.

\* \* \* \* \*

UNITED STATES PATENT AND TRADEMARK OFFICE
CERTIFICATE OF CORRECTION

PATENT NO. : 6,922,805 B2
DATED : July 26, 2005
INVENTOR(S) : Jean-Marc Reme and Gilles Delmas It is certified that error appears in the above-identified patent and that said Letters Patent is hereby corrected as shown below:

Title page,
Item [73], Assignee, change the name from "Koninklijke Phillips Electronics N.V." to -- Koninklijke Philips Electronics N.V. --.

Signed and Sealed this

Tenth Day of January, 2006

JON W. DUDAS
*Director of the United States Patent and Trademark Office*